United States Patent [19]

Murakami

[11] 4,199,995
[45] Apr. 29, 1980

[54] RECIPROCATING MOTION GENERATING APPARATUS
[75] Inventor: Saburo Murakami, Sakai, Japan
[73] Assignee: Wataru Shimokawa, Japan
[21] Appl. No.: 861,379
[22] Filed: Dec. 16, 1977
[51] Int. Cl. ............................................. F16h 25/16
[52] U.S. Cl. ..................................... 74/54; 112/323
[58] Field of Search ............... 74/832, 833, 838, 839, 74/571, 118, 55, 56, 53, 54; 112/215
[56] References Cited

U.S. PATENT DOCUMENTS

| | | | |
|---|---|---|---|
| 219,780 | 9/1879 | St. John | 74/54 |
| 431,735 | 7/1890 | Armstrong | 74/838 |
| 684,266 | 10/1901 | Klemm | 112/215 |
| 828,064 | 8/1906 | Slater | 74/53 |
| 3,427,888 | 2/1968 | Rheinländer | 74/55 |

FOREIGN PATENT DOCUMENTS 921550 of 1954 Fed. Rep. of Germany ........... 112/215

Primary Examiner—Samuel Scott
Assistant Examiner—G. A. Anderson
Attorney, Agent, or Firm—William Drucker

[57] ABSTRACT

A cylindrical cam is obliquely mounted on a drive shaft to be shiftable in the axial direction. The cam and the drive shaft are concentric at the axial center and the eccentricity of the cam increases gradually towards the opposite ends and in opposite phases. A pair of contact members carried by a follower member engage the opposite sides of the cam. As the drive shaft is rotated a reciprocating motion is imparted to the follower member and by shifting the cam in the axial direction the amplitude of the reciprocating motion can be varied.

9 Claims, 10 Drawing Figures

RECIPROCATING MOTION GENERATING APPARATUS

BACKGROUND OF THE INVENTION

This invention relates to a reciprocating motion generating apparatus in which the amplitude and the phase of reciprocating motion can be varied.

While a number of mechanisms for converting rotary movements into reciprocating motions have been proposed a cam mechanism is the typical one of such mechanisms. In a widely used cam mechanism comprises a cam having a constant diameter and two rollers or contact pieces engaging the periphery of the cam so that the cam rotates, the rollers are oscillated to cause rods connected to the roller to reciprocate. While this cam mechanism can produce reciprocating or swinging motion since the eccentricity of the cam is constant, it is impossible to adjust the amplitude and the phase of the reciprocating motion. Accordingly, it is necessary to add independently adjusting mechanism which not only increases the cost but also noise generated by the mechanism.

SUMMARY OF THE INVENTION

It is the principal object of this invention to provide a novel reciprocating motion generating apparatus capable of readily adjusting the amplitude and the phase of the reciprocating motion.

According to this invention, there is provided a reciprocating motion generating apparatus comprising a drive shaft, a cylindrical cam having a constant diameter, the cylindrical cam having a bore for receiving the drive shaft, the bore being oblique with respect to the axis of the cylindrical cam so that eccentricity of the cam varies gradually along the drive shaft, means for changing the relative axial position of the cam with respect to the drive shaft, a follower member, and a pair of contact members carried by the follower member to engage the opposite sides of the cylindrical cam thereby imparting a reciprocating motion to the follower member when the drive shaft rotates.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 1:
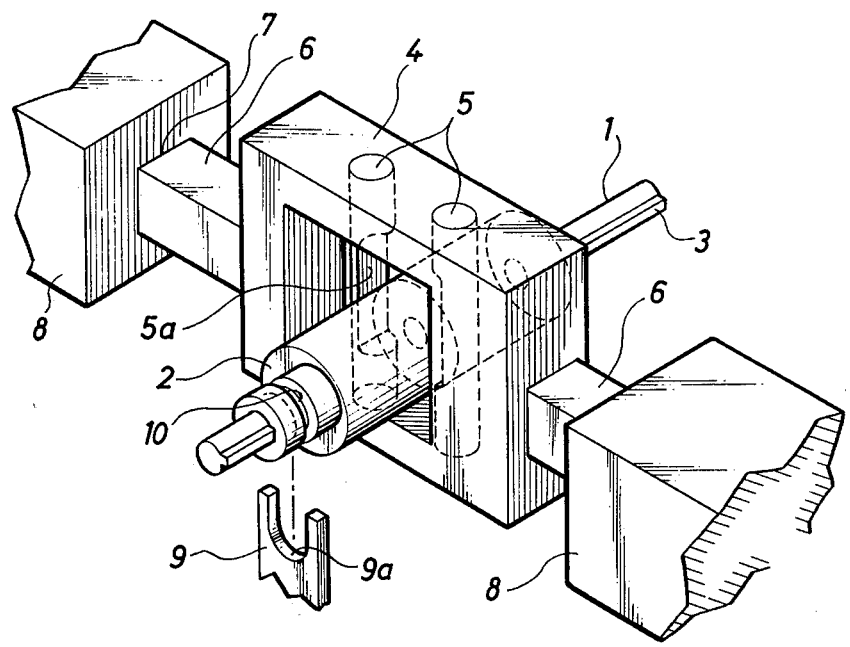
FIG. 1 is a perspective view of a preferred embodiment of this invention.
Figure 2:
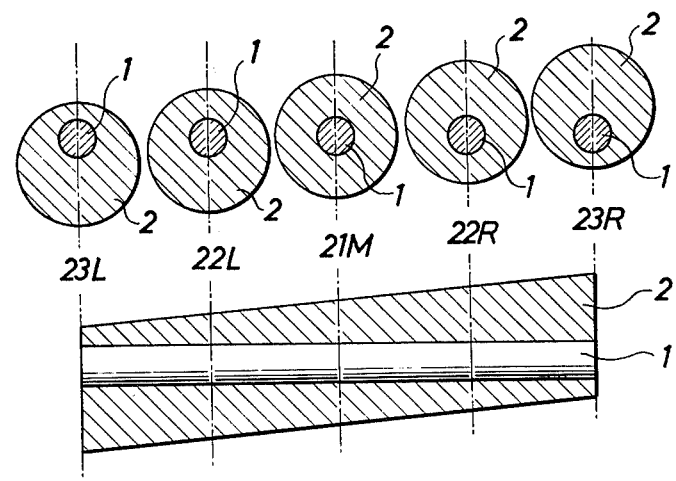
FIG. 2 shows a longitudinal section of a cylindrical cam and cross-sections at different points along the axis of the cam showing the variation in the eccentricity.

A preferred embodiment of this invention shown in FIGS. 1 and 2 comprises a rotary shaft 1 rotatably supported by a stationary frame, not shown, and rotated by an electric motor or the like, not shown, and a cylindrical cam 2 having a uniform diameter and mounted on shaft 1 by means of a key 3, the eccentricity of the cam varying continuously in the axial direction. In other words, the shaft 1 extends obliquely through the cylindrical cam 2. As shown in FIG. 2 the shaft 1 and the cam 2 are concentric at the axial center and the eccentricity varies gradually toward opposite ends. A hollow rectangular follower member 4 is disposed in a plane perpendicular to the cylindrical cam 2 and provided with a pair of rotatable parallel contact members. One half of each of the contact members is cut away to form parallel flat surfaces 5a which are spaced by a distance equal to the diameter of the cylindrical cam so as to clamp the cylindrical cam between flat surfaces 5a. A pair of guide bars 6 are secured to the outside of the vertical legs of the follower member 4. The guide bars 6 are received in guide openings 7 provided for a frame 8. Accordingly, the follower member 4 can move in a direction perpendicular to the axis of the rotary shaft 1. An arm 9 for adjusting the amplitude of the reciprocating motion is provided for a suitable portion of the frame, not shown. The arm 9 is provided with a semicircular notch 9a which is received in an annular groove 10 provided for one end of the cylindrical cam 2 for shifting the same in the axial direction. Thus, the amount of movement of the cam follower 4 is varied by varying the contact points between the contact members 5 and the cylindrical cam 2.

The operation of this embodiment can be more fully understood from FIG. 2. As above described at the axial center 21M, the rotary shaft 1 and the cylindrical cam 2 are concentric and the eccentricity increases from the center 21M towards both ends 23L and 23R through intermediate portions 22L and 22R, the eccentricities at both ends having a phase difference of 180°. The contact members 5 are always maintained in intimate contact with the periphery of the cylindrical cam. At the center position 21M since the rotary shaft 1 and the cylindrical cam 2 are concentric, rotation of the rotary cam 2 does not result in any movement of the follower member 4. As the contact point departs from the central point, the eccentricity increases continuously towards both ends but in opposite phase thereby increasing the amount of displacement of the follower member. However, the directions of movement of the follower member are opposite on both sides of the central position.

Figure 3A:
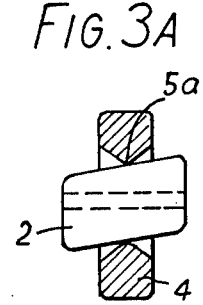
FIGS. 3A, 3B, 3C, 3D and 3E show some examples of the contact member.
Figure 3B:
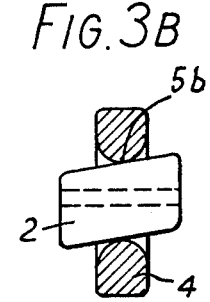
Figure 3C:
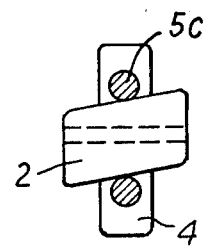
Figure 3D:
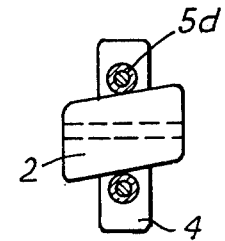
Figure 3E:
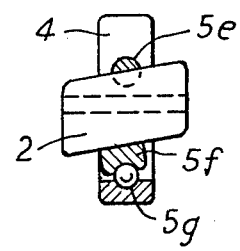

FIGS. 3A, to 3E show some examples of the contact members. More particularly, in the case shown in FIG. 3A, and 3B the contact respective members 5a and 5b are integral with the follower member 4, the former having a triangular cross-section while the latter a semicircular cross-section. However, it should be understood that both contact members 5a and 5b may have the same sectional configuration so long they can engage the cylindrical cam 2 with point contacts. In the case shown in FIG. 3C, contact member 5c takes the form of a circular rod secured to the follower member 4 while in FIG. 3D the contact member 5d takes the form of a roller rotatably supported by the follower member 4. Further, in the case shown in FIG. 3C, one of the contact members 5e takes the form of a semicircular rod with its flat side contacted against the cylindrical cam 2 while the other contact member 5f takes the form of a tiltable member supported by a ball 5g. However, it should be understood that FIGS. 3A through 3E show only few examples of the contact members.

Figure 4:
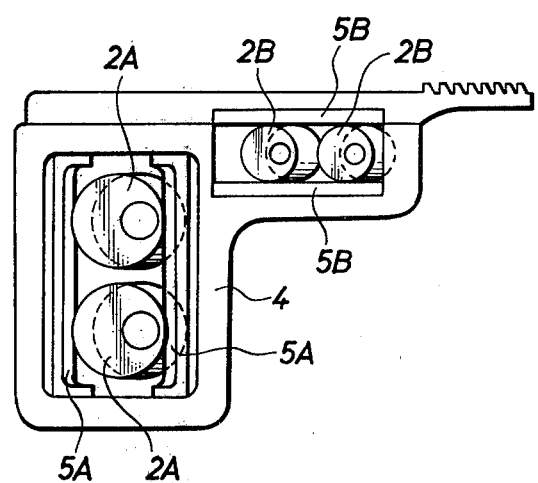
FIG. 4 is a front view of a mechanism utilizing two reciprocating motion generating apparatus of this invention for actuating a follower member.

FIG. 4 shows one application of this invention wherein two pairs of cylindrical cams 2A, 2A and 2B and 2B are provided for the follow member 4 in directions at right angles. Contact members 5A are disposed on the opposite sides of the cylindrical cams 2A and contact members 5B are disposed on the opposite sides of the cylindrical cams 2B. By rotating the cylindrical cams 2A and 2B at the same speed and at a definite relationship the follower member 4 is reciprocated in the vertical and horizontal directions with variable amplitude and phase. Thus, the follower member 4 can be imparted with a circular motion, an eliptical motion with variable major and minor axes or a vertical or horizontal linear motion. Where cylindrical cams 2A and 2B have the same diameter the follower member 4 can be moved along a rectangular path. It will be clear that, only one cylindrical cam may be provided in each direction instead of two.

Figure 5:
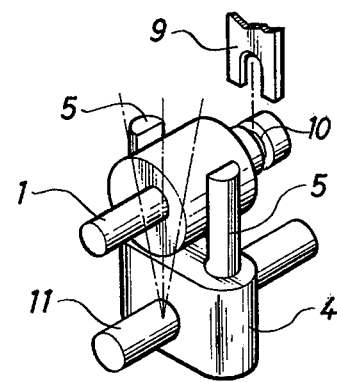
FIG. 5 is a partial perspective view of a mechanism for generating a reciprocating motion and FIG. 6 is a perspective view showing an application of the apparatus of this invention to obtain a horizontal feeding motion of a cloth feeding member of a sewing machine.

FIG. 5 shows an application of this invention for applying rotary and reciprocating motions. More particularly, a follower shaft 11 is mounted on the follower member 4 and the cylindrical cam 2 is disposed to rotate between opposing follower member 5 secured to the upper surface of the follower member 4, thereby imparting reciprocating and rotary motions to the follower shaft 11.

Figure 6:
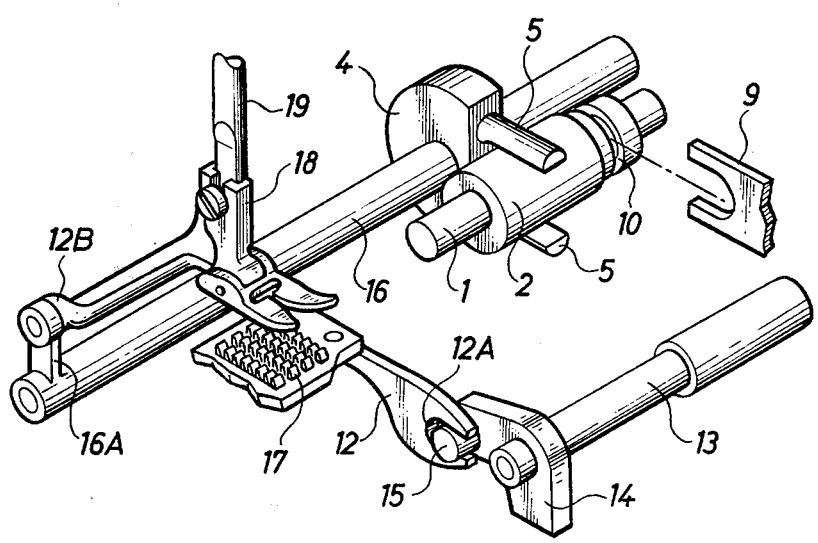

FIG. 6 shows an application of this mechanism to a cloth feeding mechanism of a sewing machine. The cloth feeding mechanism comprises a feed lever 12 with feed teeth 17 secured to an intermediate portion thereof, and a shaft 13 journalled by the machine frame, not shown, for imparting vertical motion to the feed lever. A crank arm 14 is secured to one end of shaft 13 and a roller 15 is rotatably mounted on one end of the crank arm 14 to engage a bifurcated end 12A of the feed lever 12, whereby the feed lever is oscillated in the vertical direction by the swinging movement of the crank arm 14. The opposite end 12B of the feed lever 12 is pivotally connected to the arm 16A of a horizontal shaft 16 extending in parallel with shaft 13 so that as the shaft 16 is imparted with a swinging motion, the end 12B is reciprocated in the horizontal direction. In this manner, an eliptical motion is imparted to the feed teeth by the resultant of the horizontal reciprocating motion imparted by shaft 16 and the vertical reciprocating motion imparted by shaft 13. The feed teeth 17 are moved in the foreward direction while being raised for raising the cloth together with a clamping plate 18 which is secured to the lower end of a rod 19 for urging the cloth against a needle plate, not shown, and then lowered while continuing its forward motion to a level lower than the upper surface of the needle plate. Thereafter, the feed teeth 17 are moved rearwardly while being lowered further, and then raised again. These motions are repeated to feed the cloth. To feed the cloth in the opposite direction, the phase of the displacement is changed 180° so as to raise the cloth and the clamping plate when the feed teeth are retracted.

The apparatus of this invention is used to drive the horizontal shaft 16. Thus, the horizontal shaft 16 is secured to the follower member 4 and the cylindrical cam 2 is mounted on the drive shaft 1 to be movable in the axial direction thereof. The drive shaft 1 is mounted in parallel with the horizontal shaft 16 and the contact members 5 engage the cylindrical cam 2 on the opposite sides thereof, in a manner as shown in FIG. 5. The amplitude of the reciprocating motion can be adjusted by changing the contact points between the contact members 5 and the cylindrical cam 2 by operating arm 9, thereby adjusting the amount of feed of the cloth. When the contact members 5 are in the middle position 21M shown in FIG. 2, the amount of feed of the cloth is zero since at this position the eccentricity of the cylindrical cam 2 is zero. As the contact positions are moved to position 22R and then to 23R, the eccentricity of the cylindrical cam increases gradually, thus increasing the feed amount of the cloth. Assume now that when the contact members are at a position intermediate of positions 21M and 23R, the feed teeth are advanced while being raised and then lowered to advance the cloth in the forward direction, when the contact members are at a position between 21M and 23L, as the phase of displacement imparted by the cylindrical cam 2 is changed 180° the feed teeth 17 are moved rearwardly while being raised and then lowered whereby the close is moved in the opposite direction. In the same manner, the amount of cloth feed increases gradually as the contact members are moved from position 21M to position 23L.

According to this invention, by using a simple mechanism it is possible to readily and smoothly change the amplitude and phase of the reciprocating motion. Consequently, the apparatus of this invention is useful for operating the cloth feed mechanism and the zig-zag sewing mechanism of a sewing machine and for many other reciprocating members which require smooth adjustment of the amplitude and phase of the reciprocating motion.

What is claimed is:

1. Reciprocating motion generating apparatus in combination with a sewing machine comprising:
  (a) a drive shaft;
  (b) a cylindrical cam having a constant diameter;
  (c) a bore in said cam for receiving said shaft, said bore being oblique with respect to the axis of said cam so that the eccentricity of said cam varies gradually along said shaft;
  (d) means for changing the relative axial position of said cam with respect to said shaft;
  (e) a follower member;
  (f) a pair of contact members carried by said follower member to engage opposite sides of said cam thereby imparting reciprocating motion to said follower member when said drive shaft rotates;
  (g) a follower shaft parallel with said drive shaft and secured to said follower member so that oscillatory motion is imparted to said follower shaft;
  (h) means operatively connecting said follower shaft to a cloth feed lever of a sewing machine to impart circular and reciprocating motions to said lever.

2. Apparatus according to claim 1 wherein one contact member is tiltable and supported by a ball.

3. The apparatus according to claim 1 wherein said cylindrical cam and said drive shaft are concentric at the axial center thereof and the eccentricity of said cam varies gradually towards both ends with opposite phases.

4. The apparatus according to claim 1 wherein said contact members are fixedly secured to said follower member.

5. The apparatus according to claim 1 wherein said contact members have a triangular configuration with its apex engaged with said cylindrical cam.

6. The apparatus according to claim 1 wherein said contact members takes the form of a semicircule with its round side engaged with said cylindrical cam.

7. The apparatus according to claim 1 wherein said contact members comprise circular rods secured to said follower member.

8. The apparatus according to claim 1 wherein said contact members comprise rollers rotatably supported by said follower member.

9. The apparatus according to claim 1 wherein said contact members comprise a rod having semicircular cross-section with its flat side engaged against said cylindrical cam.

* * * * *